Feb. 17, 1970  R. D. FOSKETT ET AL  3,496,364
LINEAR ENCODER HAVING A FRINGE PATTERN
PRODUCED BY OPTICAL IMAGING
Filed Jan. 23, 1968  4 Sheets-Sheet 1

INVENTORS
ROGER D. FOSKETT
SEYMOUR N. WASSERMAN
BY
ATTORNEYS

Feb. 17, 1970  R. D. FOSKETT ET AL  3,496,364
LINEAR ENCODER HAVING A FRINGE PATTERN
PRODUCED BY OPTICAL IMAGING
Filed Jan. 23, 1968  4 Sheets-Sheet 2

INVENTORS.
ROGER D. FOSKETT
SEYMOUR N. WASSERMAN
BY
ATTORNEYS

Feb. 17, 1970   R. D. FOSKETT ET AL   3,496,364
LINEAR ENCODER HAVING A FRINGE PATTERN
PRODUCED BY OPTICAL IMAGING
Filed Jan. 23, 1968   4 Sheets-Sheet 3

INVENTORS
ROGER D. FOSKETT
SEYMOUR N. WASSERMAN
BY
ATTORNEYS

INVENTORS
ROGER D. FOSKETT
SEYMOUR N. WASSERMAN

BY

ATTORNEYS

United States Patent Office 3,496,364
Patented Feb. 17, 1970

3,496,364
LINEAR ENCODER HAVING A FRINGE PATTERN PRODUCED BY OPTICAL IMAGING
Roger Darby Foskett, Winchester, and Seymour N. Wasserman, Natick, Mass., assignors to Dynamics Research Corporation, Wilmington, Mass., a corporation of Massachusetts
Filed Jan. 23, 1968, Ser. No. 699,969
Int. Cl. H01j 39/12
U.S. Cl. 250—219                                    7 Claims

ABSTRACT OF THE DISCLOSURE

An electro-optical linear encoder having an optical system which rotates an image of one portion of a ruled scale by 180° and superimposes this image upon a second portion of the scale, and optical means to provide at least one phase shifted image. An array of photocells are disposed at the second portion of the scale in a position to receive light modulated by relative movement between the scale and the image, this photocell array being operative to provide a plurality of relatively phase displaced signals representative of the magnitude and sense of movement of the scale.

FIELD OF THE INVENTION

This invention relates in general to linear encoders, and more particularly to an electro-optical linear encoder providing an output indication of both the amount and direction of relative motion of a member with respect to a reference position.

DISCUSSION OF THE PRIOR ART

Incremental encoders are devices which transform mechanical motion in one dimension into an electrical digital output. The amount of motion of an element is expressed in terms of the total number of electrical pulses or counts accumulated as the element moves through a segment of space. One type of encoder which has been extensively used is a photoelectric linear encoder which employs a scale ruled with alternately opaque and transparent sectors, and a similar reticle element also ruled with alternately opaque and transparent sectors, both of which elments are positioned between a light source and a light detector. Movement of the scale with respect to the reticle then modulates the light transmitted from the source to the detector and the resulting electrical output waveform of the detector is converted by suitable electronic circuitry into a train of pulses which are then electronically counted to provide an indication of scale position.

Such encoders have found application in a wide variety of positioning devices such as automatic systems for controlling machine tool operation where measurement of the movement of a tool with respect to the bed of the machine must be made to a very high order of accuracy. Other applications of such encoders are in strain gauges, extensometers and other instruments in which the extent of movement in one or the other of two opposite directions of one object with respect to another is to be precisely determined.

In many linear encoder applications it is often necessary that the direction of relative motion be indicated as well as the amount of such motion. Direction of motion is generally indicated by providing two or more electrical signals which are selectively out of phase with each other, the relative sense of the signal phases representing the sense of the encoder motion. Phase information is obtained by generating a moiré fringe pattern which moves at speed or direction, or both, different than the movement of the encoder scale and providing electrical signals responsive to the moving fringe pattern. Conventional linear encoders provide the fringe pattern by means of a reticle having a different number of ruled sectors per unit length, or a reticle having the same number of sectors per unit length but which is skewed with respect to the scale. The use of two rulings in conventional encoders, however, with the attendant difficulties of fabrication and adjustment, prevent precise encoder operation. For example, it is difficult to maintain the precise alignment between the reticle and scale rulings necessary to achieve the intended operation. In accordance with the present invention, the difficulties of known encoders are avoided by providing a suitable optical system which produces the required moiré fringe pattern from a single ruled scale and which produces a fringe pattern not adversely affected by variations in the alignment of the scale rulings.

SUMMARY OF THE INVENTION

Briefly, the invention employs a single ruled scale and an optical system which superimposes a rotated image of one portion of the scale upon a second portion of the scale, the image being rotated 180° in the plane of the scale. Movement of the scale in one direction causes the image of the scale to move in the opposite direction. As a result, light passing through the second portion of the scale is modulated by the relative movement between the scale rulings and the image of these rulings. Two or more photosensitive detectors are arranged at the second portion of the scale, the detectors being separated along the length of the scale by a distance suitable to produce out-of-phase electrical signals in response to light passing through the second portion of the scale. The relative sense of the phase of these signals is representative of the direction of scale motion, while the number of cycles of these signals is representative of the amount of scale motion. The signals are processed by suitable circuitry which provides output signals appropriate for the intended operating purpose.

The optical system operates as follows. A light source directs a beam of light through a transparent scale which is ruled with alternate opaque and transmissive sections of equal width. An image of the scale rulings is projected from the scale onto a right angle prism, which reflects the image parallel to the plane of the scale, and then through a lens which focuses and inverts the image. The image is next doubly reflected by a penta prism onto a second portion of the scale such that the image lines are parallel to the scale rulings but rotated 180° therefrom in the plane of the scale. When the scale moves in one direction, the image of the rulings moves in the opposite direction, this relative movement providing modulation of the light passing through the second portion of the scale. The modulated light is received by a photosensor which provides a cyclical electrical signal, the number of cycles counted during a given movement being representative of the amount of movement of the scale.

In order to indicate the direction or sense of scale motion, two or more out-of-phase signals must be produced to provide a measure of the direction of movement by noting the relative leading or lagging phase position of these signals. In general, the out-of-phase signals are produced by establishing a moving fringe pattern and sensing out-of-phase portions of the moving pattern. Two embodiments are described herein for providing the requisite signals. One embodiment employs a shift plate to offset the image of a portion of the rulings to thereby provide a signal phase shifted with respect to a signal from an image which is not offset. Another embodiment employs an image of the scale rulings which is magnified to an extent sufficient, when superimposed on the rulings themselves, to produce a fringe pattern from which out-of-phase signals can be detected.

Alternatively, the scale can be formed of alternately light reflective and substantially non-reflective rulings, with the associated optics, light source and sensors all being located on one side of the scale.

BRIEF DESCRIPTION OF THE DRAWING

The invention will be more fully understood from the following detailed description, taken in conjunction with the accompanying drawings, wherein.

DESCRIPTION OF THE PREFERRED EMBODIMENTS

Figures 1, 2:
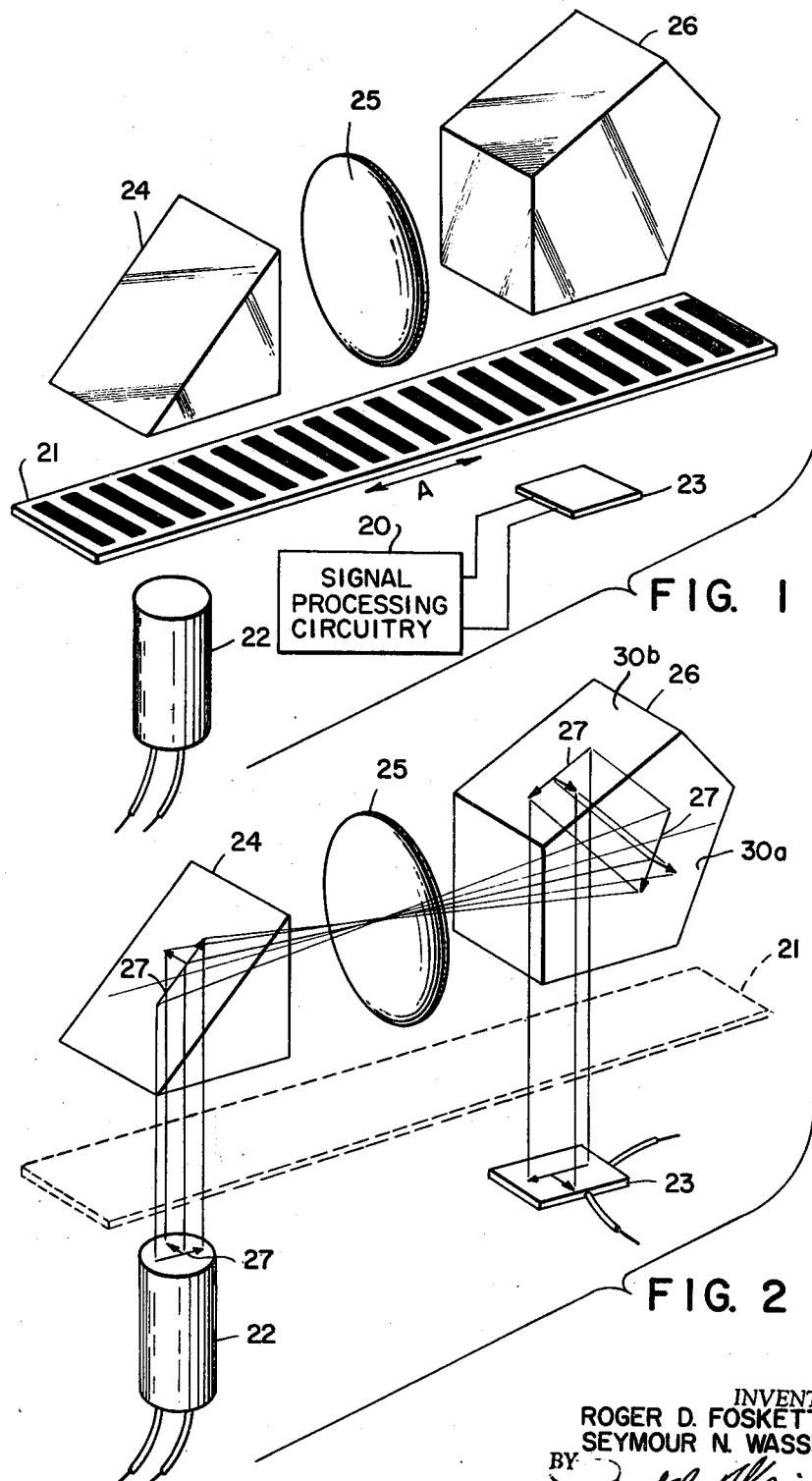
FIG. 1 is a diagrammatic pictorial view of a preferred embodiment of a linear encoder constructed in accordance with the invention.
FIG. 2 is a diagrammatic illustration showing the operation of the optical system of FIG. 1 by the use of a sample image.

Referring now to FIG. 1, an optical system combined with a movable scale is illustrated diagrammatically. Scale 21 is made of a suitable transparent material such as glass and is adapted to move in the directions indicated by arrow line A. The scale is ruled with alternately opaque and transparent sectors which are transversely oriented to the direction of movement of the scale. Scale 21 can be attached to and move with the moving element of a machine tool or the like, whose movement is to be precisely measured by the encoder, or the scale can be fixed and the optical system can move, as the situation may require. A source of light 22 and a photocell 23 are located on one side of scale 21. Photocell 23 may be any suitable photosensitive device such as a silicon solar cell, and is connected to signal processing circuitry 20 which provides the intended indications of scale motion. On the opposite side of scale 21 are a right angle totally reflecting prism 24, a lens or lense system 25, and a penta prism 26. These three elements function to fold the image of the scale projected by light source 22 back onto a second portion of the same scale in registration with photocell 23.

The operation of the optical system upon a sample beam of light is shown in FIG. 2, with the position of the scale being shown in dashed lines. For purposes of illustration, a double arrow 27 is shown projected upward by light source 22 onto prism 24 which reflects the image in a direction parallel to the plane of the scale through lens 25. Lens 25 focuses the arrow image in inverted form onto photosensor 23, the light rays being internally reflected by surfaces 30a and 30b of penta prism 26. It is evident that the image has been rotated 180° in the plane of the scale. This is an important feature of the invention since if a slight amount of skew should exist in the ruling of scale 21 it would have no effect upon the operation of the encoder because of the optical system described above. For example, if the lines in scale 21 were not accurately ruled perpendicular to the direction of movement of the scale, the image which is folded back upon the second portion of the scale, although rotated 180° and traveling in the opposite direction with respect to the scale itself, will still be aligned with the actual scale sectors by reason of this 180° rotation. Thus, although a leading sector of the scale has become the trailing sector of the image, the actual orientation of the image sectors is parallel to the direction of the sectors on the scale. Thus the image of the scale will always be parallel to the scale itself.

Although the basic linear encoder shown in FIGS. 1 and 2 and described above does not provide an indication of directionality of the movement of scale 21, it will provide an indication of the absolute amount of motion of scale 21. This is provided by means of the image of the scale being folded back upon a second portion of the scale with the scale image moving oppositely to the direction of the scale itself to cause modulation of the light impinging upon photosensor 23. Furthermore, due to the fact that the image is moving in a direction opposite to that of the scale itself, movement of the scale a distance of one opaque sector will cause the image to move in an opposite direction an equal amount. If a period of movement of the scale is defined as one opaque and one transparent sector, the output of photosensor 23 will have passed through one complete cycle with movement of the scale through only one-half cycle. Thus, a linear encoder constructed according to these principles provides an output which has a resolution essentially double that of the resolution of the scale itself, that is, for every period through which the scale 21 moves, the output of photosensor 23 will have passed through two complete periods. Employing the above-described principles of this invention, means for producing out-of-phase output waveforms which are used to provide indications of directionality will now be described in detail.

SHIFT PLATE EMBODIMENT

Figure 3:
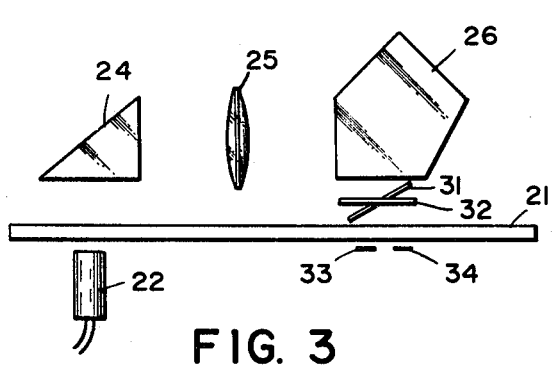
FIG. 3 is a diagrammatic elevational view of an embodiment of the encoder of FIG. 1 using shift plates to obtain signals with a phase displacement.
Figure 4:
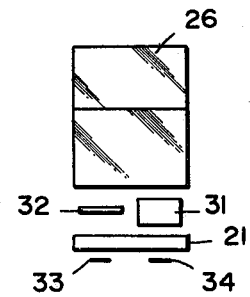
FIG. 4 is a right end view of the embodiment of FIG. 3.
Figure 5:
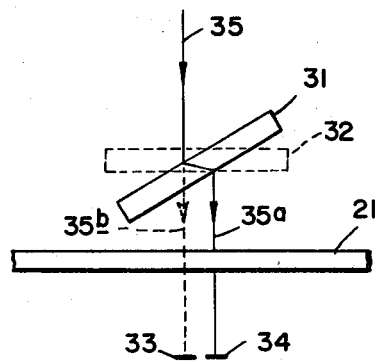
FIG. 5 is a detailed view of the operation of the shift plates of FIG. 3.

Referring to FIGS. 3–5, there is shown an embodiment for obtaining two out-of-phase signals by means of a pair of shift plates 31 and 32 disposed between penta prism 26 and scale 21. Other than shift plates 31 and 32, this embodiment is similar to that of FIG. 1. A photosensor 33 is placed beneath scale 21 in registration with shift plate 32 and a photosensor 34 is placed beneath scale 21 in registration with shaft plate 31. The purpose of shift plate 32 is to compensate for the change in focal length introduced by the tilted shift plate 31. Photosensors 33 and 34 are shown with a longitudinal spacing in FIG. 3 which is greatly exaggerated. FIG. 5, while showing the operation of shift plate 31 in an exaggerated fashion, more accurately indicates the true relationship of photosensors 33 and 34 while also indicating the operation of the shift plates upon light ray 35. In this instance, light ray 35 is assumed to have two separate components 35a and 35b passing through shift plates 31 and 32 respectively.

As described in conjunction with FIG. 1, the image of the scale which is reflected back onto scale 21 by prism 24, lens 25 and penta prism 26 will cause the light which reaches photosensors 33 and 34 to be modulated. That portion of the image which passes through shift plate 32 is directly incident upon scale 21 and the light reaching photosensor 33 is modulated in the same way as if shift plate 32 were not present. However, the portion of the image passing through shift plate 31 is shifted a slight amount with respect to the portion of the image which passes through shift plate 32 as indicated in FIG. 5. This is caused, of course, by the normal deflection of light rays at a surface between two media which have different indices of refraction. If the shift plates are made of glass, the desired amount of shift may be accomplished with a given plate thickness by tilting shift plate 31 to the precise angle which will give the desired amount of shift.

It is normally desired, when using two outputs which differ in phase for directional determination, that the phase difference be 90°, this difference being easily accomplished and easily utilized by the associated electronic circuitry. A 90° output difference between photosensor 33 and photosensor 34 would require the image passing through plate 31 to be shifted one quarter period or one-half sector with respect to scale 21. If, for example, the scale is ruled with 1,000 lines per inch, then a period on the scale would be composed of one such line and one adjacent transparent sector and would be 0.001 inch long. If we desire to offset the image which is superimposed upon the scale by 90°, we then must shift it by an amount equal to one-fourth period or 0.00025 inch. The angle of tilt of shift plate 31 with respect to the surface of scale 21 may then be easily calculated, given the index of refraction of shift plate 31 and the thickness thereof. The result of this amount of offset of the image superimposed upon scale 21 in registration with the photosensors causes the outputs of photosensors 33 and 34 to be out of phase by 90 electrical degrees. Standard methods may then be used in the electronic circuitry for the determination and indication of direction of movement of scale 21.

MAGNIFICATION EMBODIMENT

Figure 6:
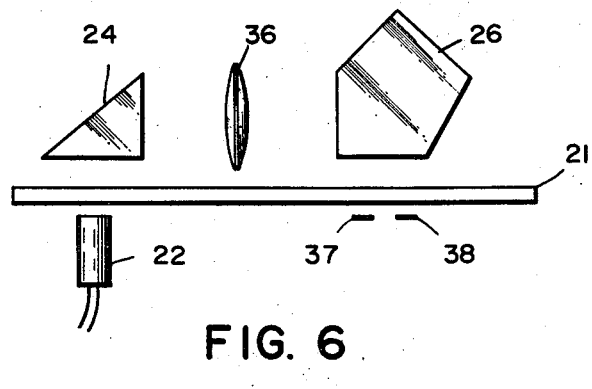
FIG. 6 is an elevational view of a second embodiment of the encoder of FIG. 1 using the principle of magnification of the image to obtain the desired phase shift.
Figure 7:
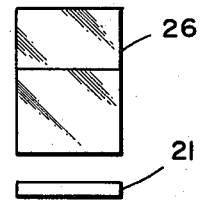
FIG. 7 is a right end view of the embodiment of FIG. 6.
Figure 8:
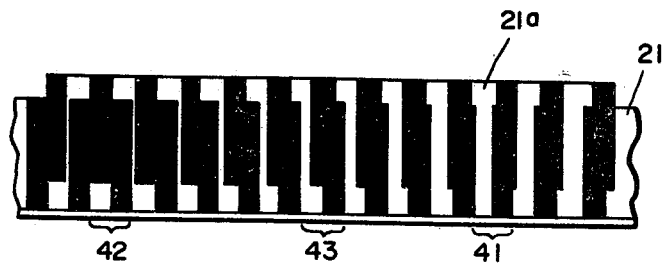
FIG. 8 is a plan view of the scale of FIG. 6 with the image superimposed thereon.

The embodiment shown in FIGS. 6–8 employs the principle of magnification of the image to obtain the desired phase shift. This embodiment accomplishes the desired phase shift in a manner which is similar in result to that of devices which use a reticle which has a different number of periods per unit length with respect to the scale with which it must operate. Lens 36 in this embodiment, which can of course be a compound lens system, is a magnifying lens rather than simply a focusing lens as was lens 25 in the previous embodiment. Thus the image which is superimposed upon scale 21 by reflection from penta prism 26 is larger than the scale itself. That is, one period of the image is larger than one period of the scale. The result is clearly shown in FIG. 8, where image 21a is shown superimposed upon scale 21 and, for purpose of illustration, is slightly offset from the scale rulings so that both scale 21 and image 21a are clearly discernible. With reference to scale 21, FIG. 8 shows that period 41 allows a maximum amount of light to pass through the scale. Period 42, on the other hand, allows a minimum amount of light to pass through the scale, while period 43 allows an amount of light equal to one-half the maximum to pass through the scale. Thus, if a photosensor is placed below period 42 and a second photosensor is placed below period 43, their outputs will be out of phase by 90°, while the output of a photosensor placed beneath period 41 would be 180° out of phase with the photosensor placed beneath period 42.

If scale 21 is ruled, for example, with 1,000 lines per inch, then the distance between period 42 and period 43 is 0.004 inch, since period 43 is four periods away from period 42. However, it would be more realistic to assume a smaller differential between the width of the opaque lines than it shown in FIG. 8; consequently, the distance between periods 42 and 43 would be greater. A typical actual magnification embodiment of a 1000-line-per-inch scale employs a distance between periods 41 and 42 of 0.07 inch, that is, 70 lines are required for a 180° output difference. In such case, the image then should be magnified so that 69 periods of the image are superimposed upon a portion of the scale having 70 periods within the same length, the half-transmission period 43 being 35 lines or 0.035 inch away from either period 41 or 42. Photocells 37, 38 beneath periods 42, 43 respectively, separated by 0.035 inch, would then have electrical outputs 90° out of phase.

It should be understood that although the above description of this embodiment assumes a magnified image, the embodiment would work equally well if the image were made smaller, that is, if the image were the result of negative magnification. Thus, in the example just given, the image could have 71 periods overlying the 70 periods of the scale.

With the more realistic distance of 0.035 inch between the 90° phase shifted scale periods it is relatively simple to place two photocells in a proper position to produce the two 90° phase shifted outputs. The two out-of-phase outputs are then utilized in a manner similar to that described for the shift plate embodiment.

If desired, two photocells electrically connected back to back may be used for each output signal in any of the embodiments described. It is only necessary for such a configuration that the amount of light impinging upon one photocell of a pair be at a maximum while the light impinging upon the other be at a minimum. To double the encoder sensitivity, four photocells placed 45° apart with respect to the fringe pattern can be employed, or well known pulse interpolation circuitry can be used with the above-described photocell arrangements to increase the sensitivity.

Figure 9:
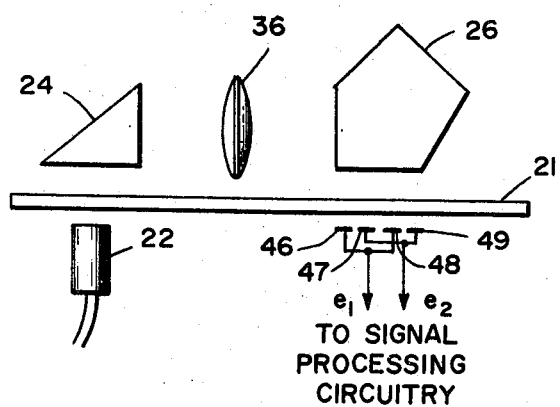
FIG. 9 is an elevational view of an embodiment of the encoder of FIG. 6 using four photosensors.

FIG. 9 shows the encoder embodiment of FIG. 6 having four photosensors arranged in phase opposed pairs to sense four portions of the fringe pattern. The sensors 46, 47, 48 and 49 are disposed along the length of scale 21, each being positioned with respect to the fringe pattern to sense a portion thereof which is 90° out of phase with an adjacent portion. Cells 46 and 48 are interconnected back-to-back, that is, in phase opposition, while cells 47 and 49 are similarly interconnected back-to-back. For example, if the output of cell 46 is assumed to be at zero phase, the output of cell 48 is at 180°. Similarly, the output of cell 47 will be at 90°, while the output of cell 49 will be at 360°. As the image of the rulings and the scale move relative to one another, each interconnected pair of cells maintains its 180° phase differential, causing the output $e_1$ to have an average value of zero and to have two zero crossings per cycle, one crossing when the waveform goes from maximum to minimum. The output $e_2$ from sensors 47 and 49 is similar to $e_1$ but is phase shifted therefrom by 90°. These output signals are applied to suitable signal processing circuitry which is operative to provide indications of the extent and sense of scale motion.

Figure 10:
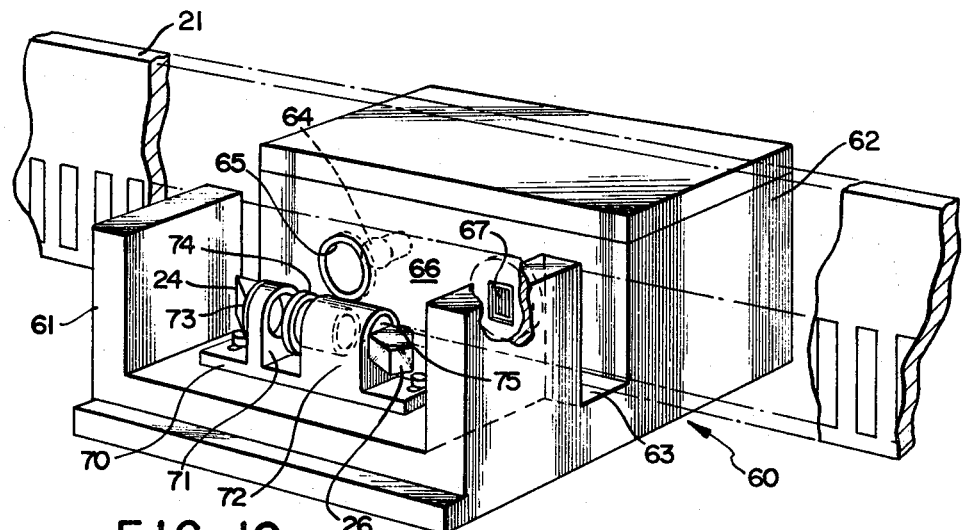
FIG. 10 is a pictorial view of an encoder head embodying the invention.

The encoder is typically housed as shown in FIG. 10, for purposes of illustration, the magnification embodiment being illustrated. Referring now to FIG. 10, the encoder is packaged in a generally rectangular housing 60 which includes a front enclosure 61 and a rear enclosure 62, separated by a channel 63 which extends across the width of the case 60, and which dimensioned to accommodate the linear scale 21. Enclosure 61 has a cover plate which, for clarity, is not shown. The light source and the photocell array are mounted in rear enclosure 62, while the optical assembly is mounted in front enclosure 61. More particularly, light source 64 is located on one side of enclosure 62 in operative relation to a lens 65 which is suitably mounted in an opening provided in wall 66 of enclosure 62 confronting channel 63. The photocell array 67 is located on the opposite side of enclosure 62, in another opening provided in wall 66. A glass cover plate (not shown) may be provided over the photocell array to shield it from dust or the like.

The optical assembly, mounted in front enclosure 61, includes a base member 70 having a first upstanding member 71 and a second wider upstanding member 72, these members having cylindrical axially aligned openings therein. The right angle prism 24 is secured to a mounting ring 73 which is inserted into member 71 and is rotatably adjustable therein to align the prism. Lens system 36 is contained in a barrel 74 which is threadably mounted within the cylindrical opening of member 72.

The penta prism 26 is mounted by any suitable means, such as mounting ring 75, in the opening on the end of member 72 opposite lens system 36. The assembly is dimensioned such that prism 24 is in light transmitting relationship with lens 65 and light source 64, and prism 26 is in light transmitting relationship with photocell array 67. Lens system 36 is axially adjustable within member 72 to allow proper focusing and magnification of the scale rulings.

Figure 11:
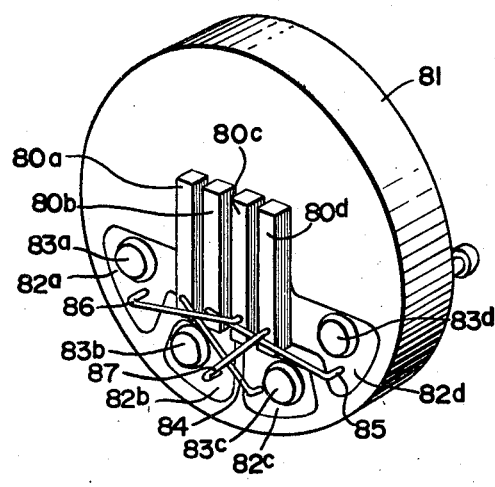
FIG. 11 is a pictorial view of a photocell array useful in the present invention.

The photocell array 67 is shown in enlarged form in FIG. 11. Four photosensitive cells 80a–80d are disposed on a cylindrical header 81, in a parallel array. The cells are spaced with respect to the divisions of the fringe pattern so that each cell is spatially displaced 90° from the adjacent cell, and cell pairs 80a and 80c, and 80b and 80d are electrically interconnected back to back. Each cell is in intimate contact with a respective conductive film terminating in conductive portions 80a—80d, to which are attached respective terminals 83a–83d. The second terminal of each cell is connected to a respective conductive portion; cell 80a is connected to portion 82c via wire 84, cell 80b is connected to portion 82d via wire 85, cell 80c to portion 82a via wire 86, and cell 80d to portion 82b via wire 87. With the connections thus made, cell pairs 80a and 80c, and 80b and 80d are interconnected in phase opposition. The cells are connected by means of terminals 83a–83d to suitable signal processing circuitry (not shown) which can be disposed within enclosure 62.

Housing 60 is generally mounted in a stationary position in a working system, while the ruled scale is mounted for translational movement within channel 63. Of course, in certain instances it may be desirable to mount the scale in a stationary position and movably dispose the housing 60.

What is claimed is:

1. An electro-optical linear encoder comprising:
   an elongated scale having transverse rulings thereon;
   a light source disposed with respect to said scale to illuminate a first portion of said scale;
   optical means for projecting an image of the rulings of said first scale portion onto the rulings of a second portion of said scale, said optical means including means for rotating said image 180° in the plane of said scale and means for altering said image in a direction parallel to the length of said scale to produce at said second scale portion a fringe pattern in a direction parallel to the length of said scale;
   said scale and said optical means being adapted for relative longitudinal movement therebetween;
   photosensitive means disposed with respect to said scale to receive light from said second scale portion and operative to produce in response thereto at least two electrical signals of different phase; and
   circuit means operative in response to said electrical signals to produce signals representative of the magnitude and direction of relative motion between said scale and said optical means.

2. The encoder according to claim 1 wherein said optical means includes lens means operative to alter the size of said image such that said altered image and the rulings of said second scale portion produce said fringe pattern.

3. The encoder according to claim 1 wherein said optical means includes lens means operative to magnify the size of said image such that said magnified image and the rulings of said second scale portion produce said fringe pattern.

4. The encoder according to claim 3 further including a housing having first and second portions with a channel formed therebetween adapted to accommodate said scale in slidable relationship therein;
   said light source and said photosensitive means being contained in said first portion, said optical means being contained in said second portion.

5. The encoder according to claim 3 wherein said photosensitive means includes four elongated photosensitive cells arranged in an array parallel to said rulings and each spaced such that each cell is spatially displaced from the adjacent cell with respect to said fringe pattern by 90°, alternate ones of said cells being interconnected in phase opposition.

6. The encoder according to claim 1 wherein said optical means includes
   means for reflecting the image of said first scale portion in a direction parallel to said scale;
   a penta prism operative to reflect said image onto said second scale portion and rotate said image 180° in the plane of said scale; and
   lens means disposed between said reflecting means and said penta prism and operative to alter the size of said image and focus said altered image onto said second scale portion such that said altered image and the rulings of said second scale portion produce said fringe pattern.

7. The encoder according to claim 6 wherein said optical means are disposed in light transmitting relationship by an adjustable mounting assembly; and wherein said reflecting means is a right angle prism.

References Cited

UNITED STATES PATENTS

| | | |
|---|---|---|
| 2,788,519 | 4/1957 | Caldwell. |
| 2,858,727 | 11/1958 | Stamm et al. |
| 3,244,895 | 4/1966 | Anderegg. |
| 3,384,755 | 5/1968 | Williamson et al. ____ 250—227 |

FOREIGN PATENTS

| | | |
|---|---|---|
| 760,321 | 10/1956 | Great Britain. |

ARCHIE R. BORCHELT, Primary Examiner

C. M. LEEDOM, Assistant Examiner

U.S. Cl. X.R.

250—231; 356—169